INVENTORS W. H. MANNING, JR.
E. J. THERIOT
BY
Walter M. Hiel
ATTORNEY

STRIP TRANSMISSION LINE DIODE SWITCH

United States Patent Office 3,538,465 Patented Nov. 3, 1970

3,538,465

STRIP TRANSMISSION LINE DIODE SWITCH

William H. Manning, Jr., Winston-Salem, and Eugene J. Theriot, Greensboro, N.C., assignors to Bell Telephone Laboratories, Incorporated, Murray Hill and Berkeley Heights, N.J., a corporation of New York Filed Jan. 21, 1969, Ser. No. 792,568
Int. Cl. H01p *1/10, 3/08*
U.S. Cl. 333—97 8 Claims

ABSTRACT OF THE DISCLOSURE

Two PIN diodes are connected in parallel between the center conductor and the ground plane of a strip transmission line. Radio frequency connection to the center conductor is through a series capacitor. Bias for switching the diodes is introduced through a band reject filter (quarter-wave line with open-circuited, quarter-wave stubs at its ends) in series with a radio frequency inductive stub. The capacitor and filter parts are all in strip line configuration. In forward bias, the diode inductances resonate with the series capacitance to short the transmission line. Reverse bias puts the inductive stub in antiresonance with the diode capacitances to remove the short.

The invention herein claimed was made in the course of, or under contract with The Department of the Army.

BACKGROUND OF THE INVENTION

This invention relates to the long line wave transmission art and more particularly to a strip transmission line diode switch in which both the transmission line and the bias isolating network for the diodes can be constructed in strip transmission line configuration.

Microwave diode switches of the prior art have been controlled by current through an isolating network composed in whole or in part of lumped elements which are not readily produced in strip transmission line configuration, particularly by photolithographic means. Representative of such switches are those disclosed in U.S. Pat. 3,179,816 granted Apr. 20, 1965 to R. D. Hall and R. D. Stewart and in U.S. Pat. 3,346,824 granted Oct. 10, 1967 to W. C. Jakes, Jr. Wherever lumped elements are employed, both size and cost are increased and reliability becomes a major problem. Where circuits can be constructed by photolithographic techniques, there is no appreciable increase in cost regardless of the complexity of the network and reliability is generally considerably improved, mainly because of the simplicity of the resulting structure as well as the accuracy with which optimally dimensioned parts can be reproduced. The present invention has made it possible to construct not only the transmission lines but the entire bias injection network in strip transmission line configuration using photolithographic techniques.

SUMMARY OF THE INVENTION

The switch of this invention comprises a diode means connected in series with a capacitor between the center conductor and the ground plane of a strip transmission line. Bias for switching the diode means is introduced through a band reject filter in series with a radio frequency inductive stub, all the filter parts and the inductive stub, as well as the capacitor, being formed in strip transmission line configuration. The bias and diode circuits are so constructed that, in forward bias, the inductance of the diode means is caused to series resonate with the capacitor to short the transmission line through the very low forward-bias resistance of the diode means while, in reverse bias, the inductive stub is caused to be in parallel resonance with the capacitance of the diode means to remove the short.

BRIEF DESCRIPTION OF THE DRAWINGS

The invention may be better understood by reference to the accompanying drawings in which.

DETAILED DESCRIPTION

Figure 1:
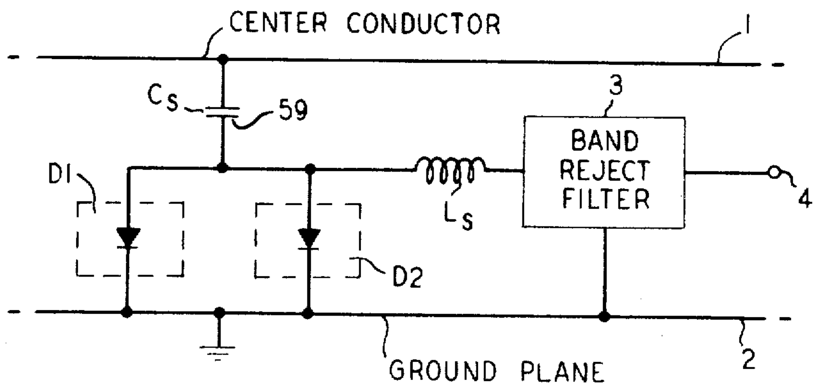
FIG. 1 is a schematic diagram showing the essential circuits of a preferred embodiment of the invention.

The circuit diagram of FIG. 1 schematically represents a strip transmission line with a center conductor 1 and a ground plane 2 between which are connected a capacitor $C_S$ in series with a pair of parallel-connected diodes D1 and D2. Bias is supplied to the diodes through a band reject filter 3 from a bias terminal 4. Current supplied to terminal 4 passes through the band reject filter, through an inductor $L_S$ to diodes D1 and D2. The band reject filter is constructed to provide a short to ground at the junction between the inductor $L_S$ and filter 3 at the operating frequency of the transmission line. Therefore, at the operating frequency, inductor $L_S$ is effectively connected in parallel with the diodes. Moreover, the filter 3 completely isolates the microwave frequency from the bias source which may be connected to terminal 4. The details of this filter are disclosed more fully in FIG. 4.

Figure 2:
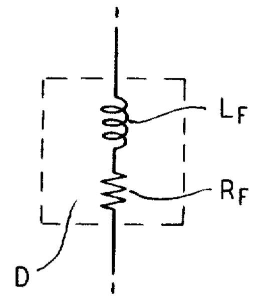
FIGS. 2 and 3 show the simplified equivalent networks provided by PIN diodes in forward and in reverse bias, respectively.
Figure 3:
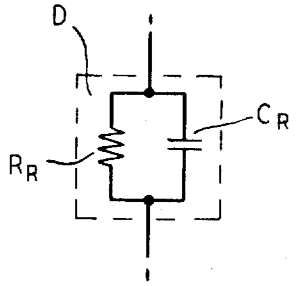

Before explaining the operation of the circuit of FIG. 1, reference will first be made to FIGS. 2 and 3 which respectively show the equivalent networks of the diodes in their forward-bias and reverse-bias states. When the diodes are forward biased, the equivalent network as shown in FIG. 2 comprises an inductance $L_F$ and a very low resistance $R_F$, these being connected in series. This equivalent network not only represents each of the individual diodes D1 and D2 but can also represent the two diodes connected in parallel. Since, in the forward-bias condition, diodes D1 and D2 in FIG. 1 may be represented by the circuit of FIG. 2, capacitor $C_S$ can be brought into series resonance with the equivalent inductance $L_F$ at the operating frequency. Thus, there effectively appears between center conductor 1 and ground plane 2 only the very low resistance $R_F$ constituting a practical short circuit across the transmission line to stop transmission of signals. When the bias current is reversed at terminal 4, the diodes become reverse biased so that their equivalent network will be as shown in FIG. 3. Under these circumstances the equivalent capacitance $C_R$ is brought into parallel resonance with the shunting inductance $L_S$ leaving only the very large resistance $R_R$ in series with capacitor $C_S$ across the transmission line. Since the reverse resistance $R_R$ is very high, this will constitute a practical open circuit to permit transmission of signals.

While the broad principles involved are quite similar to those employed in prior art circuits, the particular organization of elements involving capacitor $C_S$ and inductor $L_S$ permits an arrangement whereby practically all of the parts, except for the diodes themselves, may be constructed in strip transmission line configuration using photolithographic techniques. This is a particular advantage in this invention over prior art circuit arrangements since, as previously indicated, the production of circuits by photolithographic techniques considerably improves both reliability and economy. The manner by which a practical circuit may be realized employing the principles of this invention is best illustraetd by reference to FIG. 4.

Figure 4:
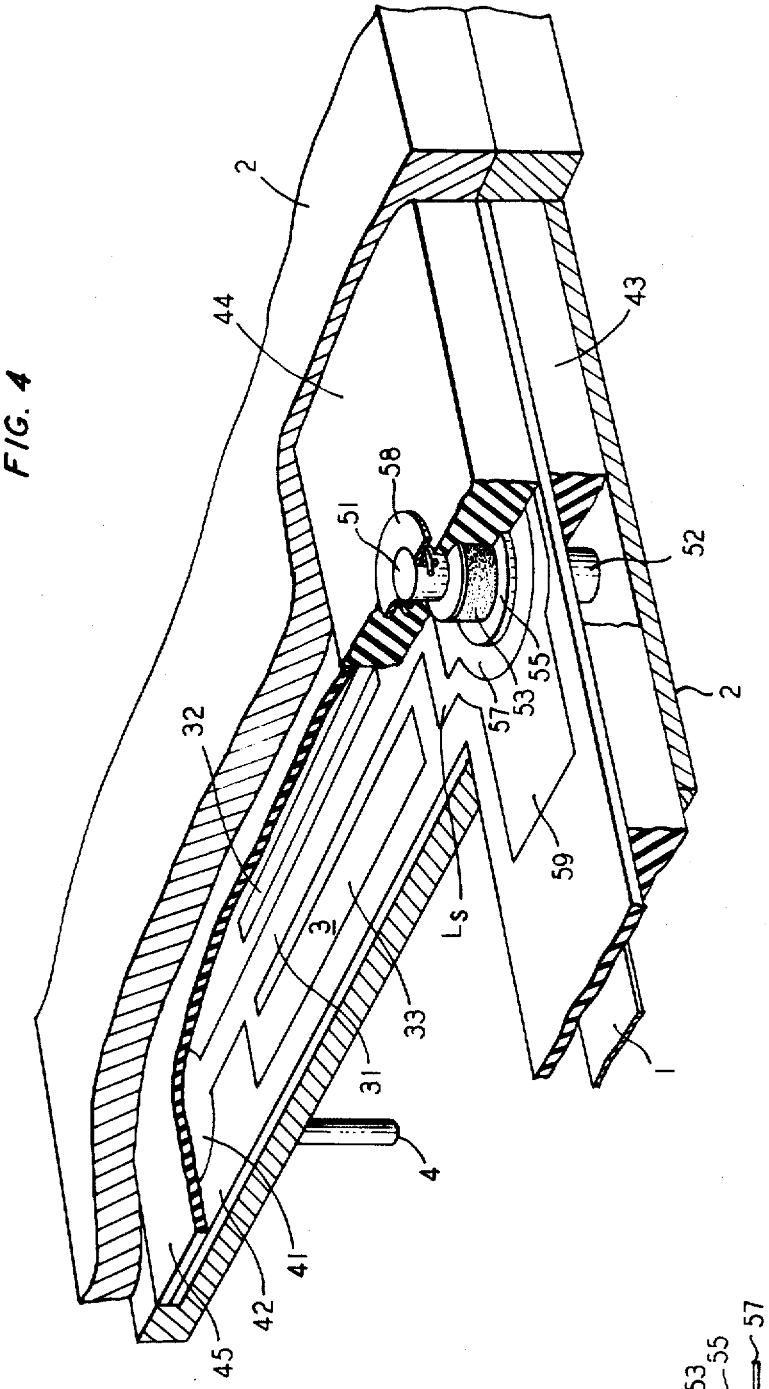
FIG. 4 discloses the salient features of a practical embodiment of the invention.

FIG. 4 shows a fragmentary section of a strip transmission line having a center conductor 1 and ground plane conductors 2. Center conductor 1 is formed on one side of a thin, flexible substrate 42, preferably a product marketed under the trade name Mylar. The thickness of this substrate in FIG. 4 is considerably exaggerated for clarity. Center conductor 1 and its substrate 42 are included between a pair of dielectric slabs 43 and 44 and the entire assembly is included between the two parts of ground plane 2 which completely surround all sides of the transmission line. The two parts of ground plane 2 are secured together by conventional means, not shown. Center conductor 1 and ground plane 2 correspond to the parts bearing the same reference numerals in the schematic diagram of FIG. 1. Also, in FIG. 1, capacitor $C_S$ is shown having a lower plate 59 which corresponds to plate 59 in FIG. 4. Plate 59 is formed on the upper side of substrate 42 so that it cooperates with an opposing portion of center conducor 1 to form capacitor $C_S$. The diode package is secured to this capacitor plate 59 by means of a metal tab 57, the parts being preferably secured by welding. The details of the diode package are better shown in FIG. 5.

Figure 5:
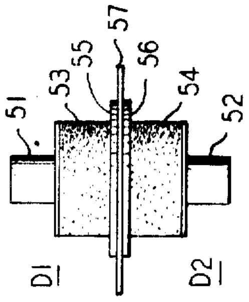
FIG. 5 shows the diode package of the two PIN diodes used in the embodiment of FIG. 4.

In FIG. 5 diodes D1 and D2 are preferably of the PIN type and are shown with their heads 55 and 56 brought together forming a sandwich with diode tab 57 between them. Heads 55, 56 and tab 57 are preferably welded together forming a unitary package of the two diodes. Diode D1 comprises a diode stub 51 secured to a hollow ceramic cylinder 53 and which is in turn secured to its head 55. Diode D2 is similarly constructed having a stub 52, a hollow ceramic cylinder 54 and head 56. The diode chips are mounted inside the ceramic cylinders and the diode terminals connected respectively to the stubs and to the heads. As the internal diode construction is conventional, further description thereof is unnecessary.

Referring again to FIG. 4, diodes D1 and D2 are shown with their tab 57 secured to capacitor plate 59, it being understood that ceramic cylinder 54 and stub 52 extend through an aperture through plate 59, substrate 42 and center conductor 1. All diode parts are insulated from center conductor 1 leaving the only coupling to the center conductor 1 by way of the capacitor formed between it and plate 59. Plate 59 is dimensioned so that capacitance $C_S$ will resonate with the equivalent inductance $L_F$ of the diodes when in forward conduction. Each of the stubs 51 and 52 is connected to the ground plane through a chuck 58, one of which is shown in fragmentary section in FIG. 4.

Inductor $L_S$ shown in FIG. 4 is formed by a small stub $L_S$ extending laterally of capacitor plate 59 and formed integral therewih. Also extending laterally of plate 59, is the band reject filter 3 which comprises a quarter-wave section of transmission line 31 and a pair of open-circuited quarter-wave stubs 32 and 33, respectively. Stub 32 is connected to the end of the quarter-wave line 31 at its junction with inductor $L_S$ while stub 33 is connected to the opposite end of line 31. The opposite end of this line also terminates in capacitor plate 41 which forms a capacitance with the ground plane through the dielectrics of substrate 42 and a thin insulator 45. Insulator 45 may be of the same material and of the same thickness as substrate 42. The bias injection terminal 4 is carried through an insulator in the lower portion of ground plane 2 and connected to capacitor plate 41. It is to be understood that all parts of the band reject filter, capacitor plate 41, inductor $L_S$ and capacitor plate 59 are formed as an integral unit on substrate 42 and their construction is readily accomplished by photolithographic techniques.

The operation of the practical embodiment shown in FIG. 4 corresponds exactly with that previously described for the schematic diagram of FIG. 1. It is to be remembered that the open-circuited quarter-wave stubs 32 present short circuits to ground at either end of the quarter-wave line 31, thereby effectively providing the radio frequency connection of the inductor stub $L_S$ in parallel with the diodes D1 and D2.

What is claimed is:

1. A diode switch circuit for a strip transmission line, said line being of the type having a center conductor on one side of a dielectric film included between two layers of dielectric material and a ground plane covering the outside surfaces of said layers, said switch circuit comprising a conductive layer on the other side of said film to form a capacitor with said center conductor, a diode means connected between said conductive layer and said ground plane whereby a series circuit of said diode means and said capacitor is formed between said center conductor and said ground plane, a strip of dielectric film extending laterally of said transmission line and having on one surface thereof an electric circuit in strip line configuration, said circuit comprising a band reject filter and a radio frequency inductor, said inductor connecting said filter to said conductive layer, said filter providing a radio frequency short circuit to the ground plane at its junction with said inductor, and means including a conductive path through said filter and inductor for applying a direct current bias to said diode means.

2. The combination of claim 1 wherein said diode means comprises a pair of PIN diodes connected in parallel.

3. The combination of claim 1 wherein said band reject filter comprises a section of quarter-wave transmission line with an open-circuited, quarter-wave stub at each of its ends.

4. The combination of claim 1 wherein said means for applying a direct current bias to said diode means includes a bias terminal and a conductive layer on said laterally extending strip of dielectric film to form a bypass capacitor with a surface of said ground plane, said conductive layer being directly connected to said bias terminal and to said band reject filter.

5. A diode switch circuit for a strip transmission line, said line being of the type having a center conductor on one side of a dielectric film included between two layers of dielectric material and a ground plane of conductive material covering the outside surfaces of said layers, said switch circuit comprising two diodes having one terminal of each diode conductively joined to a conductive tab, a conductive layer on the opposite side of said film to form a capacitor with said center conductor, an aperture through said conductive layer, center conductor, dielectric film and layers of dielectric material to receive said diodes, means electrically connecting said tab to said conductive layer, means conductively securing the other terminal of each diode to said ground plane, a strip of said dielectric film extending laterally of said transmission line opposite said aperture and having on one surface thereof an electric circuit in strip line configuration, said circuit comprising a band reject filter and a radio frequency inductor connecting said filter to said conductive layer, said filter providing a ratio frequency short circuit to the ground plane at its junction with said inductor and means including a conductive path through said filter and inductor for applying a direct current bias to said diodes.

6. The combination of claim 5 wherein said two diodes are of the PIN type.

7. The combination of claim 5 wherein said band reject filter comprises a section of quarter-wave transmission line with an open circuited quarter-wave stub at each of its ends.

8. The combination of claim 5 wherein said means for applying a direct current bias to said diodes includes a bias terminal and a conductive layer on said laterally extending strip of dielectric film to form a by-pass capacitor with a surface of said ground plane, said conductive layer being directly connected to said bias terminal and to said band reject filter.

References Cited

UNITED STATES PATENTS

| | | | |
|---|---|---|---|
| 3,138,768 | 6/1964 | Evans | 333—97 |
| 3,179,816 | 4/1965 | Hall et al. | 307—259 X |
| 3,245,014 | 4/1966 | Plutchok et al. | 333—7 X |
| 3,337,820 | 8/1967 | Harper | 333—7 |
| 3,346,824 | 10/1967 | Jakes | 333—98 |
| 3,475,700 | 10/1969 | Ertel | 333—84 |

HERMAN K. SAALBACH, Primary Examiner

W. H. PUNTER, Assistant Examiner

U.S. CL. X.R.

333—7, 73, 84; 327—161, 160